July 6, 1948.  W. C. EYLES ET AL  2,444,598
TILE-SAWING MACHINE

Filed June 16, 1947  3 Sheets—Sheet 1

W.C. Eyles
C. E. Hyatt
INVENTORS
BY *CA Snow & Co.*
ATTORNEYS.

July 6, 1948.   W. C. EYLES ET AL   2,444,598
TILE-SAWING MACHINE

Filed June 16, 1947   3 Sheets-Sheet 3

W. C. Eyles
C. E. Hyatt
INVENTORS

BY Charow & Co.
ATTORNEYS.

Patented July 6, 1948

2,444,598

UNITED STATES PATENT OFFICE 2,444,598

TILE-SAWING MACHINE

Wilfred C. Eyles, Bayfield, Colo., and Carl E. Hyatt, East San Diego, Calif.

Application June 16, 1947, Serial No. 754,929

2 Claims. (Cl. 125—13)

This invention relates to tile-sawing machines, and particularly to the type of tile-sawing machines which are portable having a self-contained water supply for maintaining the saw cool and at the same time providing means for flushing loose material from the saw cut, to insure the operation of the saw and eliminating chipping of the tile at the point of cut.

Still another object of the invention is to provide a tile saw of this character wherein the cutting of the tile takes place above the center of the blade, thereby eliminating any wedging action, which is present when the sawing is accomplished by a blade mounted above the work due to the fact that the blade tends to draw the tile forwardly faster than it can cut.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 5 is a fragmental plan view of the machine, illustrating a gauge used in forming angular cuts.

Figure 6 is a sectional view taken on line 6—6 of Figure 1.

Figure 7 is a sectional view taken on line 7—7 of Figure 1.

Figure 8 is a sectional view taken on line 8—8 of Figure 1.

Figure 1:
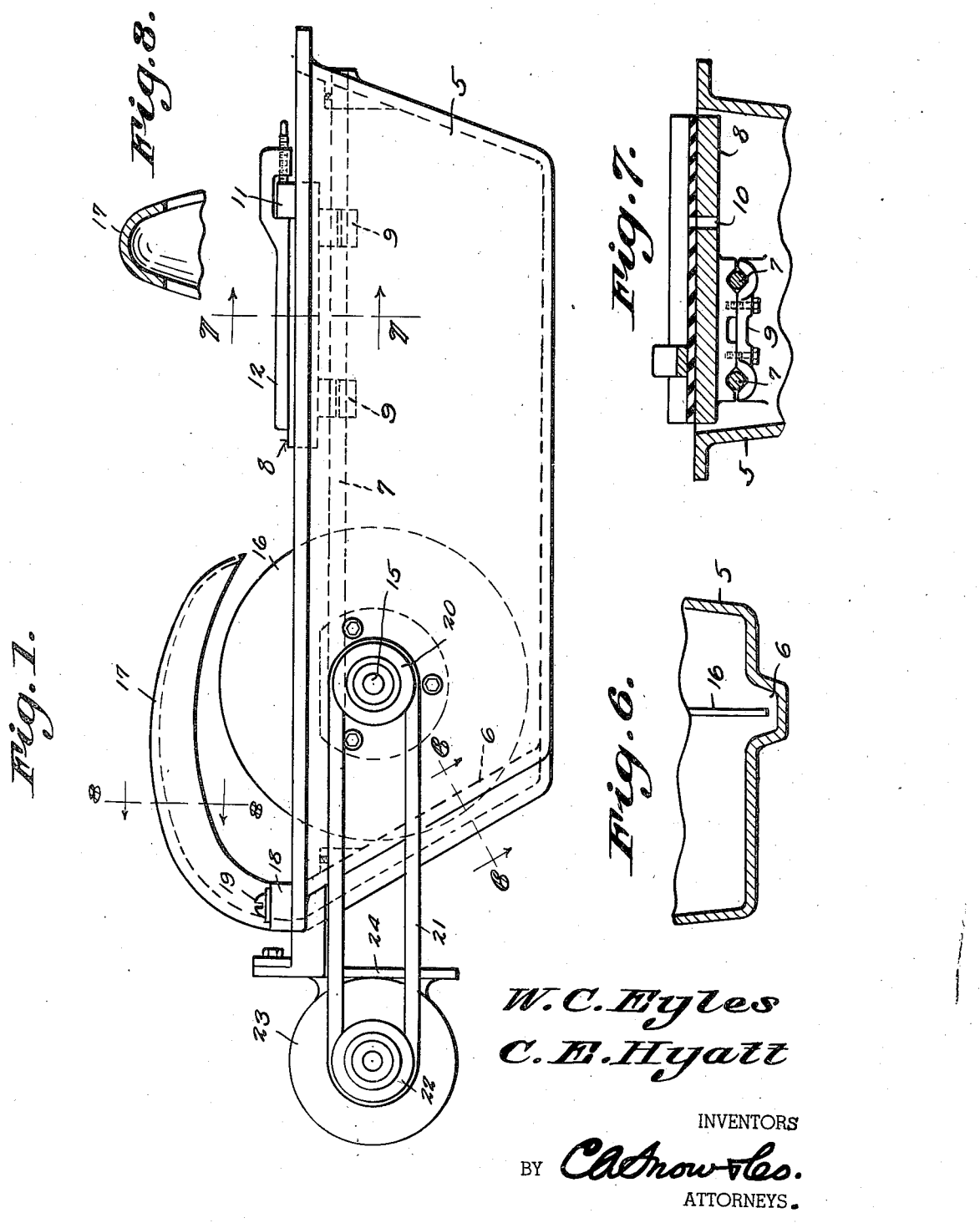
Figure 1 is a side elevational view of a tile sawing machine, constructed in accordance with the invention.
Figure 2:
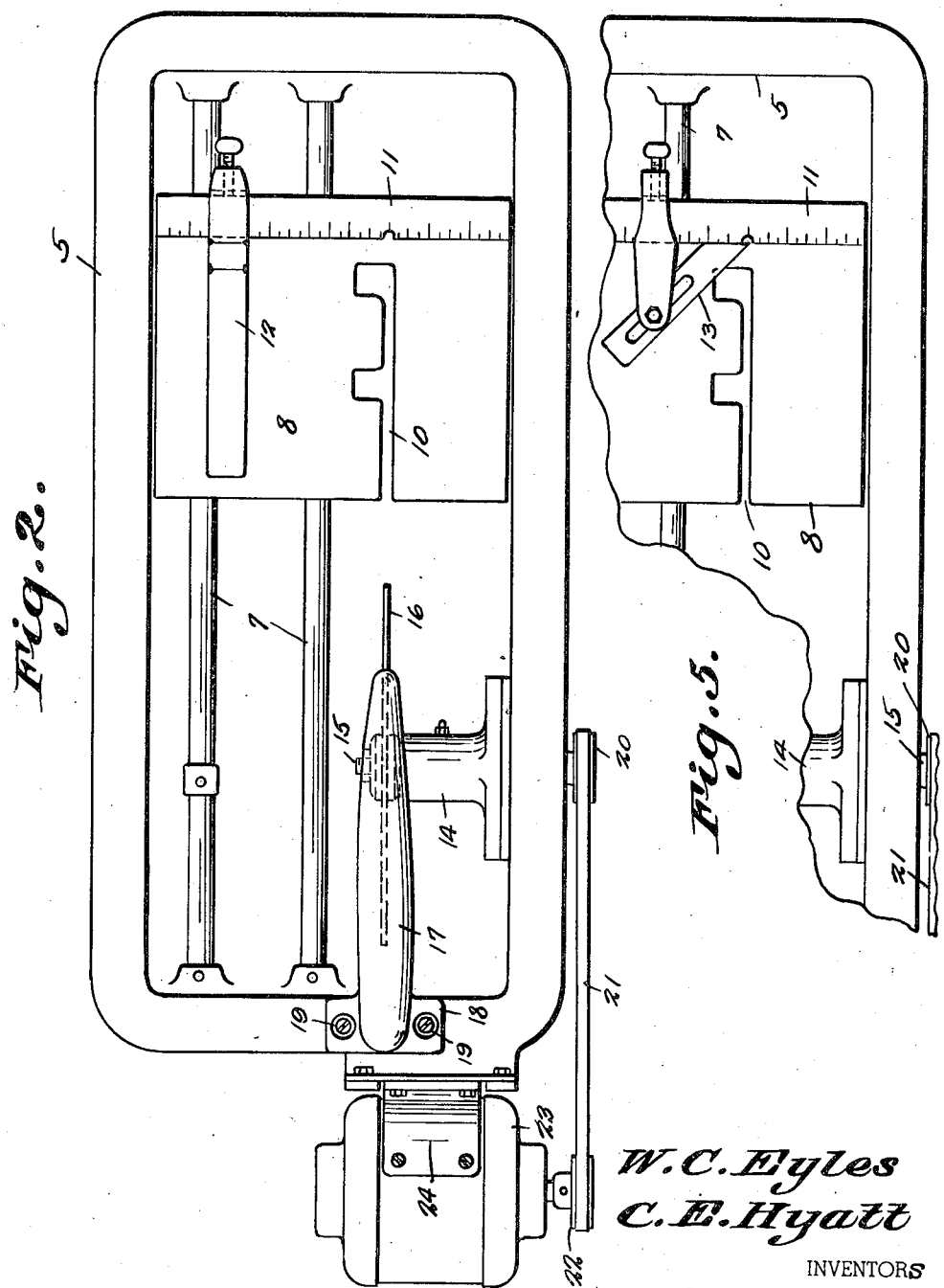
Figure 2 is a plan view thereof.
Figure 3:
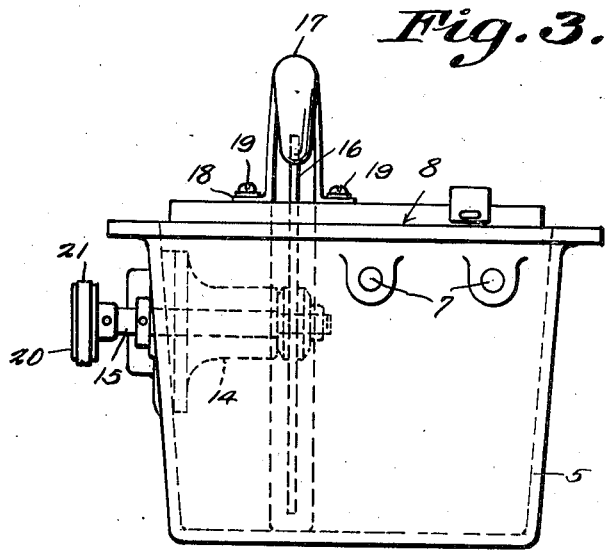
Figure 3 is an end elevational view of the machine.

Referring to the drawings in detail, the reference character 5 indicates the portable tank, which is formed with the groove 6 in one end wall thereof, the groove extending throughout the length of the end wall.

Extending in parallel spaced relation with respect to each other, at the top of the tank, are horizontal rods 7 on which the sliding table 8 is mounted, the sliding table 8 having grooves to fit over the rods 7, there being provided a clamp 9 cooperating with the table, in securing the table to the rods, as clearly shown by Figure 7 of the drawings.

A cut-out portion 10 extends inwardly from one edge of the table, and provides an opening for the saw blade while cutting the tile.

Along the front edge of the table, is a graduated bar or rule 11 designed to permit the gauge arm 12 to be properly adjusted with respect to the table, providing a stop for the tiles being cut, to insure the true cutting of the tiles.

In the form of the invention as shown by Figure 5, a protractor 13 is used in lieu of the gauge arm 12 for making angular cuts.

Figure 4:
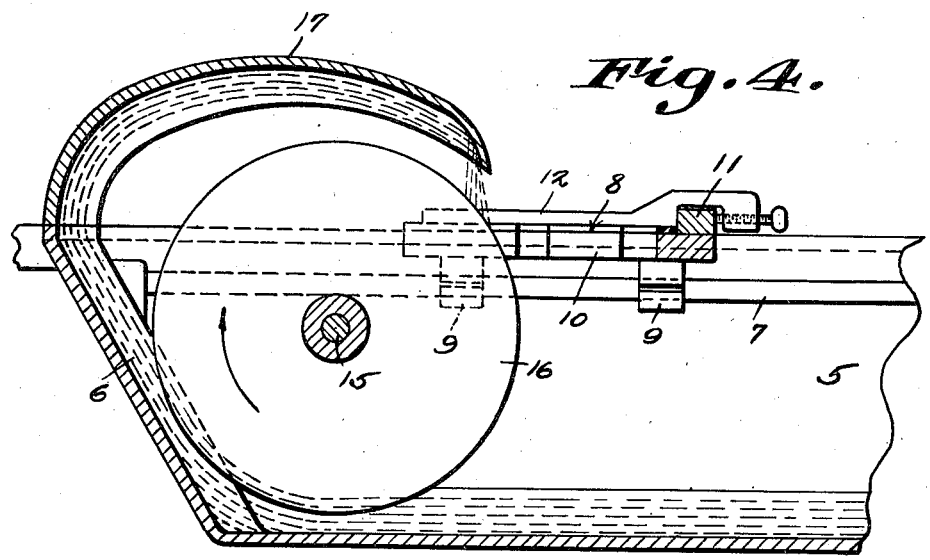
Figure 4 is a fragmental sectional view illustrating the position of the saw guard, with respect to the saw blade.

Extending inwardly from one side wall of the tank, is the bearing 14 in which the saw shaft 15 operates, the saw shaft carrying the rotary saw 16 at its inner end. This saw is so located that it moves within the groove 6, as clearly shown by Figure 4 of the drawings.

The reference character 17 indicates the saw guard which is formed to provide an inverted trough disposed directly above the saw 16, the forward end of the guard being disposed at a point directly above the point of contact between the saw and tile being cut. The end of the saw guard is closed so that water which is picked up by the saw and directed through the saw guard, will be directed downwardly against the saw blade and tile, where the tile is being cut, thereby dislodging loose material from the saw cut, and at the same time acting to cool the blade.

This guard is formed with a flange 18 which has openings for the reception of the bolts 19, whereby the guard may be secured in position at the one end of the tank.

The shaft 15 is provided with the pulley 20 which is rotated by means of the belt 21 that also moves over the pulley 22 secured to the shaft of the motor 23, which in turn is mounted on the bracket 24, secured at one end of the tank. It will, of course, be understood that the motor may be connected in any suitable house circuit so that electric energy may be supplied thereto in operating the saw. In operation, the saw is set in motion and the tile to be cut is placed on the table 8 and moved into engagement with the rapidly rotating saw.

As the saw rotates, water contained in the tank 5 is picked up by the centrifugal force of the saw and delivered upwardly through the grooved guard, where the water is directed downwardly into the area of the cutting point, thereby maintaining the material and saw cool, and at the same time, dislodging particles of the tile which may fall into the cutting area of the blade.

What is claimed is:

1. In a tile-sawing machine, a tank adapted to contain water, a rotary saw operating within the tank, said tank having a groove extending throughout the length of one end wall thereof, said saw operating within the groove and adapted to direct water in the tank upwardly through the groove, a curved guard communicating with the groove and overlying the saw in spaced relation therewith, said guard adapted to receive water from the groove and direct water to the cutting area of the saw.

2. In a tile-sawing machine, a tank adapted to contain water, a rotary saw operating within the tank adjacent to one end thereof, a water passageway formed at one end of the tank and in which said saw operates, said water passageway communicating with the tank to receive water from the tank, a curved guard forming a continuation of the water passageway and being extended over the saw in spaced relation therewith, the free end of the guard being closed and adapted to direct a spray of water to the cutting area of the saw maintaining the saw cool and dislodging material from the cutting area of the saw.

WILFRED C. EYLES.
CARL E. HYATT.

REFERENCES CITED

The following references are of record in the file of this patent:

UNITED STATES PATENTS

| Number | Name | Date |
|---|---|---|
| 1,750,737 | Walter | Mar. 18, 1930 |
| 2,063,236 | Eisler | Dec. 8, 1936 |
| 2,431,469 | Eyles | Nov. 25, 1947 |